United States Patent
Siddabathuni et al.

(10) Patent No.: US 8,443,051 B2
(45) Date of Patent: May 14, 2013

(54) DIRECT MEMORY ACCESS BUFFER MANAGEMENT

(75) Inventors: Ajoy Siddabathuni, San Jose, CA (US); Arvind Srinivasan, San Jose, CA (US); Shimon Muller, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 854 days.

(21) Appl. No.: 12/550,005

(22) Filed: Aug. 28, 2009

(65) Prior Publication Data

US 2011/0055346 A1 Mar. 3, 2011

(51) Int. Cl.
*G06F 15/167* (2006.01)
(52) U.S. Cl.
USPC ............ 709/212; 710/52; 710/56; 710/57
(58) Field of Classification Search ......... 709/212, 709/234; 710/52–57
See application file for complete search history.

(56) References Cited

U.S. PATENT DOCUMENTS

| | | | | |
|---|---|---|---|---|
| 5,303,347 A * | 4/1994 | Gagne et al. | | 711/119 |
| 6,021,132 A * | 2/2000 | Muller et al. | | 370/412 |
| 7,243,354 B1 * | 7/2007 | Chhabra et al. | | 719/314 |
| 7,502,870 B1 * | 3/2009 | Chu | | 709/250 |
| 7,886,090 B2 * | 2/2011 | Alankry et al. | | 710/53 |
| 2003/0053468 A1 * | 3/2003 | Deng et al. | | 370/402 |
| 2005/0060509 A1 * | 3/2005 | Loafman | | 711/170 |
| 2005/0138134 A1 * | 6/2005 | Poisner et al. | | 709/212 |
| 2006/0187962 A1 * | 8/2006 | Wakid | | 370/474 |
| 2007/0011327 A1 * | 1/2007 | Volodarsky et al. | | 709/226 |
| 2007/0079207 A1 * | 4/2007 | Seidel et al. | | 714/748 |
| 2009/0133023 A1 * | 5/2009 | Li et al. | | 718/102 |
| 2010/0070677 A1 * | 3/2010 | Thakkar | | 711/6 |

* cited by examiner

*Primary Examiner* — Emmanuel L Moise
*Assistant Examiner* — Sarah Drabik
(74) *Attorney, Agent, or Firm* — Polsinelli Shughart PC (57) ABSTRACT

Disclosed are systems and methods for reclaiming posted buffers during a direct memory access (DMA) operation executed by an input/output device (I/O device) in connection with data transfer across a network. During the data transfer, the I/O device may cancel a buffer provided by a device driver thereby relinquishing ownership of the buffer. A condition for the I/O device relinquishing ownership of a buffer may be provided by a distance vector that may be associated with the buffer. The distance vector may specify a maximum allowable distance between the buffer and a buffer that is currently fetched by the I/O device. Alternatively, a condition for the I/O device relinquishing ownership of a buffer may be provided by a timer. The timer may specify a maximum time that the I/O device may maintain ownership of a particular buffer. In other implementations, a mechanism is provided to force the I/O device to relinquish some or all of the buffers that it controls.

18 Claims, 10 Drawing Sheets

Fig. 1

RBR global attributes: ——— 204

- RBR-global-flush-dvect (16, 32, 64, 128, 256, 512 ...) ——— 212
    - RBR-global-flush-mult(1, 4, 8, 16, 64, 256, 512,...) ——— 216
    - RBR-global-flush-timer(in clk-cycles) ——— 220

RBR entry attributes: ——— 208

-RBR-address ——— 224
-RBR-flush-all (boolean) ——— 228
-RBR-flush-bit (boolean) ——— 232
-RBR-flush-dvect (value * RBR-global-flush-multiplier) ——— 240
-RBR-flush-dvect (value) ——— 244
-RBR-flush-timer (boolean) ——— 248

DIRECT MEMORY ACCESS BUFFER MANAGEMENT

TECHNICAL FIELD

Implementations discussed herein are directed to managing data transfers in an input/output device.

BACKGROUND

A computer system may include an input/output device (I/O device) that is operable to conduct data transfers across a data network. The I/O device may be associated with a device driver that provides commands to or otherwise controls the operation of the I/O device. In transferring data, the device driver may cause the I/O device to transmit data across a network or receive data from across the network. In either case, the device driver may provide the I/O device with an allocation of system memory for use in the data transfer. During a receive operation, packets or other data received from across the network may be stored in the allocated system memory. During a transmit operation, the allocated memory may hold the packets or other data to be transmitted across the network.

In order to efficiently utilize resources of the computer system, the I/O device may include a processor, controller or other device that is operable to directly access system memory. In particular, the I/O device may access the system memory without the intervention of the computer system's central processing unit or units as the case may be. During a data transfer, the I/O device may directly access the allocation of memory provided by the device driver. In order to ensure consistency of data, the computer's operating system or other component may designate certain segments of system memory for the exclusive use of a particular device or component. In connection with data transfers to and from an I/O device, the memory allocation provided by the device driver may be designated for use only by the I/O device until it is used in connection with a transmit or a receive operation. Once the memory allocation is so used, the I/O device may relinquish exclusive control of the memory allocation. Once this occurs, control of the memory allocation may pass to another computer system component, such as the device driver. However, in some instances, the circumstances of a particular transmit or receive operation may result in an incomplete usage of a particular memory allocation. In these cases, the I/O device may retain control of the incompletely used memory allocation for an indefinite amount of time. Accordingly, the device driver may resort to off-lining the receive or transmit operation in order to regain control of the incompletely used memory allocation. In certain cases, this may result in loss of packets or other inefficiencies.

SUMMARY

Implementations discussed herein are directed to systems and methods for reclaiming posted buffers during a direct memory access (DMA) operation. The DMA operation may be executed by an input/output device (I/O device) in connection with executing a data transfer across a network. In executing a data transfer, the I/O device may be provided with a series of buffers from a device driver. During the data transfer, the I/O device may cancel one or more of the buffers when a particular condition is met. In canceling a buffer, the I/O device relinquishes control of the buffer and ownership of the buffer passes back to the device driver. A condition for the I/O device relinquishing control of a buffer may be provided by a distance vector that may be associated with the buffer. The distance vector may specify a maximum allowable distance between the buffer and a buffer that is currently fetched by the I/O device. Alternatively, a condition for the I/O device relinquishing control of a buffer may be provided by a timer. The timer may specify a maximum time that the I/O device may maintain ownership of a particular buffer. In other implementations, a mechanism is provided to force the I/O device to relinquish some or all of the buffers that it controls.

DETAILED DESCRIPTION

Implementations discussed herein are directed to systems and methods for reclaiming posted buffers during a direct memory access (DMA) operation. As used herein, a "buffer" refers to an allocation of memory of a certain size that is operable to store data. In order to insure consistency of the data stored in the buffer, an operating system may give permission to write to and/or read from the buffer to one system component at a time. As used herein, the system component that currently has permission to write and/or read the buffer is said to "control" the buffer or, equivalently, is said to have "ownership" of the buffer. DMA operations described herein may be performed by an input/output device (I/O device) that is under the control of a device driver. As part of a data transfer, the device driver may post buffers for consumption by the I/O device. As used herein, the device driver "posts" a buffer by appropriately formatting or otherwise causing the buffer to be allocated in system memory and then passing control of the buffer to the I/O device. As used herein, "reclaiming" is an action or operation taken by the system component that posted a buffer to regain control of the buffer from a system component that currently controls the buffer. In accordance with implementations discussed herein, the I/O device may relinquish control of one or more of the buffers when a particular condition is met during a data transfer. In relinquishing control of a buffer, the I/O device passes control or ownership of the buffer and back to the device driver.

Figure 1:
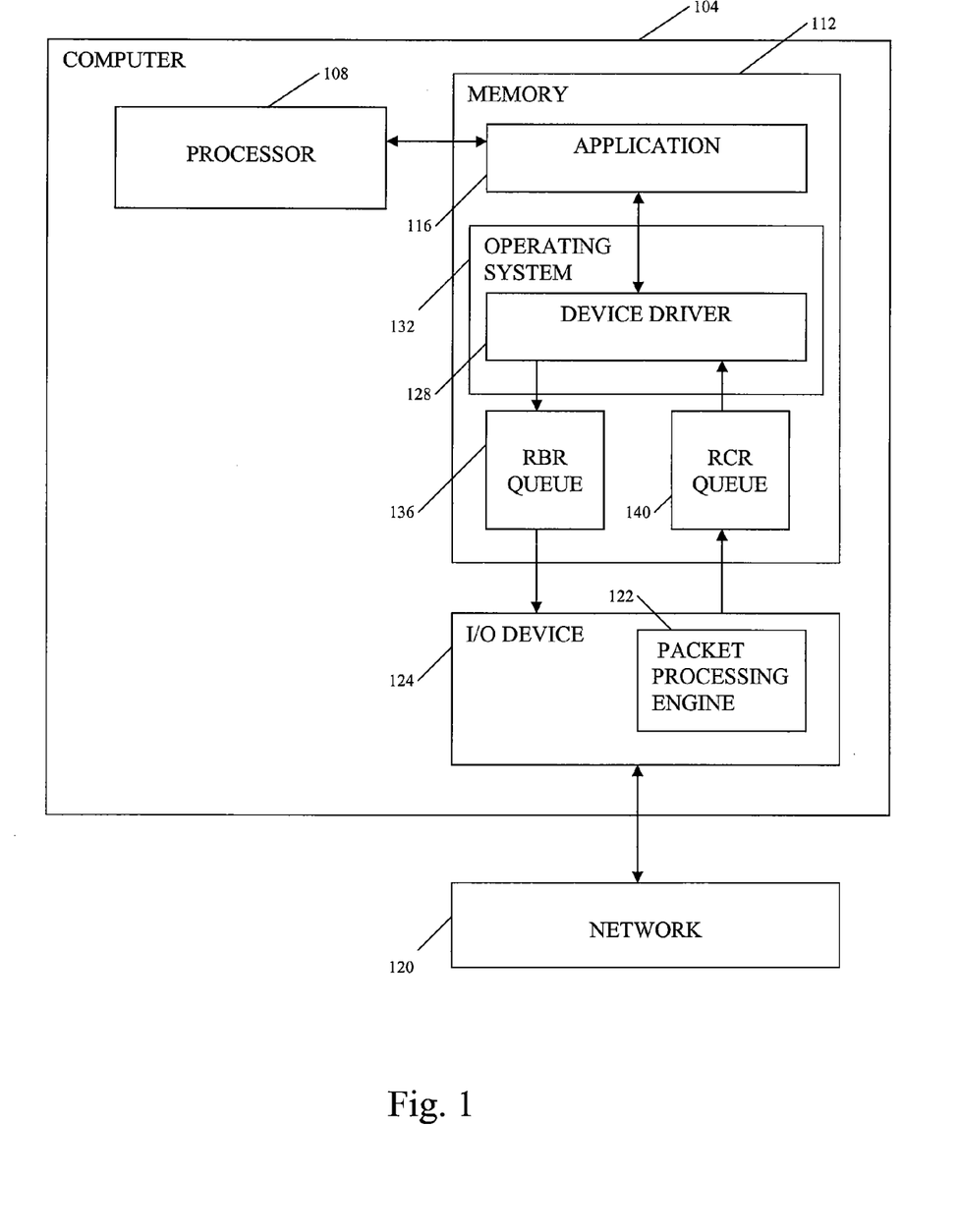
FIG. 1 is a diagram showing a computer environment having components and features in accordance with implementations discussed herein.

FIG. 1 is a computing environment showing components and features of implementations discussed herein. FIG. 1 includes a computer 104 having a processor 108. The processor 108 is provided in association with a memory 112. The memory 112 is a computer readable storage medium that is operable to store applications and/or other computer executable code which runs on the processor 108. The memory 112 may be volatile or non-volatile memory implemented using any suitable technique or technology such as, for example, random access memory (RAM), flash memory, solid state and so on.

FIG. 1 shows an application 116 in the memory 112. As part of its operation, the application 116 may be operable to send and/or receive packets across a network 120 in order to communicate with a particular network node. The application 116 may send and receive packets over the network 120 through the operation of an I/O device 124. The I/O device 124 may include a packet processing engine 122 that executes network transactions through a network connection that provides access to the network 120. The I/O device 124 may arbitrate with the processor 108 or other devices for access to the memory 112. During a data transfer, the I/O device 124 may store and/or retrieve data to and from memory 112 without intervention from the processor 108. Such data transfer operations are referred to herein as "direct memory access" (DMA) operations. In sending and receiving packets, the application 116 may communicate with the I/O device 124 through the operation of a device driver 128. The device driver 128 may be stored in the memory 112 and may include computer executable code for running the I/O device 124. The device driver 128 may be part of an operating system 132 that is associated with the computer 104.

During a DMA operation, data may be transferred between the device driver 128 and the I/O device 124 by queues that are stored in the system memory 112. As used herein, a "queue" includes a ordered set of buffers and is used to transfer data between system components. A first queue, referred to herein as the "buffer records queue" (RBR queue) 136, points from the device driver 128 to the I/O device 124. The RBR queue 136 may include a number of buffers posted by the device driver 128 to the system memory 112 for consumption by the I/O device 124. A second queue, referred to herein as a "completion records queue" (RCR queue) 140 points from the I/O device 124 to the device driver 128. As the buffers in the RBR queue 136 are consumed by the I/O device 124, a record of the consumption of the buffers is sent to the device driver 128 by the I/O device 124 through the RCR queue 140. As used herein, a buffer is said to be "consumed" when the buffer is used for its intended purpose. For instance, in a data receive context, the I/O device 124 may consume a buffer by filling the buffer with received packets. Together, the RBR queue 136 and the RCR queue 140 form a hand shaking mechanism that provides a deterministic mechanism for data transfer between the device driver 128 and the I/O device 124. In a data transmit context, the I/O device 124 may consume a buffer by transmitting the packets stored in the buffer. In the receive context, the RCR queue 140 may be used, at least in part, to manage packets, sizes of which are not known when buffers are allocated. In a data transmit context, buffers sizes may be known prior to the buffers being allocated. According, in the data transmit context, a single queue may be used in some embodiments.

The buffers posted through the RBR queue 136 may be provided in an ordered sequence. In such an arrangement, the buffers are accessed by the I/O device 124 substantially in the order that they are posted by the device driver 128. As used herein, if a first buffer is "lower" in the buffer order than a second buffer, then the first buffer was posted before the second buffer. Similarly, if a first buffer is "higher" in the buffer order, then the first buffer was posted after the second buffer. As used herein, the I/O device 124 may "fetch" a buffer, meaning that the buffer is retrieved from memory and its contents accessed and/or altered, such as by storing data to or removing data from the buffer. In some implementations, one buffer may be fetched at a time. This buffer may be referred to herein as the "currently fetched buffer."

The RBR queue 136 may be partially under the control or owned by the device driver 128 and partially owned or under the control of the I/O device 124. After the device driver 128 posts a particular buffer (or buffers) to the system memory 112, that buffer is owned by the I/O device 124. The I/O device 124 maintains ownership of the buffer until the buffer is consumed by the I/O device 124. Once the I/O device 124 has consumed a buffer, the I/O device 124 relinquishes the buffer and the ownership passes back to the device driver 128. This shared ownership of the RBR queue 136 may be viewed as a semaphore which operates to facilitate an orderly data transfer between the device driver 128 and the I/O device 124 while the data transfer is ongoing. Implementations discussed herein are directed to allowing the device driver 128 to reclaim buffers that are owned by the I/O device 124. In particular, the posted buffers are reclaimed before being consumed by the I/O device 124. As used herein, "reclaim" and "reclaiming" refer to operation or series of commands that cause the device driver 128 to retake ownership of one or more buffers that were originally posted by the device driver 128 for consumption by the I/O device 124.

By providing a mechanism for the device driver 128 to reclaim posted buffers a number of benefits may be gained. Specifically, by allowing the device driver 128 to reclaim buffers, the I/O device 124 does not hold the buffers in a specific memory location for an indefinite amount of time. Reclaiming buffers may have application in a virtual machine environment where there is a need to move and add virtual machines from one memory region to another. Reclaiming buffers as described herein may prevent an I/O device from holding references to pinned down memory pages, thus making it easier to perform such operations as moving kernel images from one memory region to another. Reclaiming buffers may also have application in connection with logical domains, which are created and torn down in real time. Reclaiming buffers as discussed herein may mitigate the problem of pinned down memory pages in logical domains such that system-images can be created or moved without resets to an I/O device. Additionally, reclaiming buffers as discussed herein may be applied to transaction processing. In particular, on the egress side of transaction processing, transaction descriptors may be timed out if they are not transferred out of an I/O device in a timely manner. Other advantages will be apparent from the discussion provided herein.

Figure 2:
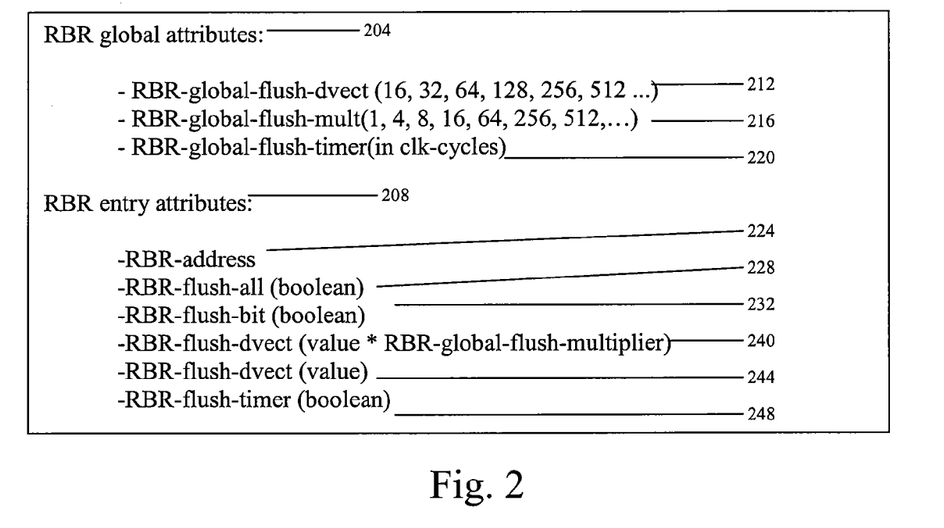
FIG. 2 is a list of attributes associated with queues posted by a device driver.

Turning now to FIG. 2, a number of RBR queue attributes are defined. The RBR queue attributes shown in FIG. 2 are flush attributes that may be used to allow the device driver 128 to reclaim the posted buffers prior to the buffers being consumed by the I/O device 124. As used herein, a "flush" attribute is one that sets a condition for the release of buffer ownership by a device, such as the I/O device 124. When a buffer is "flushed" the buffer's contents may be passed to the device driver for further processing, or in some embodiments, the buffer's contents may be discarded. FIG. 2 includes RBR global attributes 204 and RBR entry attributes 208. As used herein, a "global" RBR attribute is an attribute that is defined in a central location and is useable by any particular RBR queue 136 entry. In contrast, an "entry" RBR attribute is defined within a particular RBR entry and is accordingly specific to that particular RBR entry. As used herein, an "entry" is an individual queue element that may include at least an address pointing to a memory location. An RBR-address 224 may specify a location in system memory for a particular individual queue element. The RBR queue attributes shown in FIG. 2 may be used in various combinations as set forth herein. If memory space is available, an RBR entry attribute 208 may be used to define a flush attribute within a particular RBR entry. If memory space is limited, an RBR global attribute 204 may be used in order to preserve memory space. As described below, the attributes defined in FIG. 2 may be used in connection with flushing buffers during either a transmit or a receive operation.

The attributes defined in the FIG. 2 provide for reclaiming of posted buffers by a number of different mechanisms. In certain embodiments, a distance vector may be assigned to one or more buffers. RBR-flush-dvect 244 may be used to assign a distance vector by specifying a value within a certain queue entry. RBR-global-flush-dvect 212 may be used to assign a distance vector by specifying a global value. In this regard, RBR-flush bit 232 may be used to enable the globally defined value for a specific queue entry. RBR-global-flush-mult 216 may be used to used as a multiplier for distance vector values defined in a particular queue entry. In certain embodiments, a flush timer may be assigned to one or more buffers. Specifically, a global flush timer may be specified by RBR-global-flush-timer 220. The global flush timer may be enabled for a particular queue entry by RBR-flush-timer 248, which is defined as an entry attribute. In other embodiments, the device driver 128 may reclaim all partially filed buffers by setting the RBR-flush-all bit 228.

While a number of flush attributes are defined in FIG. 2, those used in connection with defining a distance vector will be discussed first. As used herein a "distance vector" is an integer value that specifies how far apart two buffers are within an ordered set of buffers. For example, the $5^{th}$ buffer in an ordered set of buffers is separated from the $8^{th}$ buffer by a distance vector of three. A particular buffer may be assigned a distance vector that specifies a condition that when met causes the buffer to be flushed. Specifically, in the event that the currently fetched buffer and the buffer assigned the distance vector are separated by more than the distance vector, the buffer assigned the distance vector may be flushed and ownership of the buffer may be relinquished by the I/O device 124. In this way, a maximum allowable separation between a particular buffer and the currently fetched buffer may be defined.

In one implementation, setting distance vectors allows buffers that are partially filled such as during a receive operation, to be returned to the device driver 128 prior to being completely filled. Partially filled buffers may exist during a receive operation due to a number of aspects of packet transmission techniques. In one instance, partially filled buffers may result from the fact that a particular buffer is partitioned into sub-blocks such that the buffer will store only packets of a certain size. The I/O device 124 may define three types of buffer sizes: small, medium and large. In one example, small packets may be those packets that are between zero and 256 bytes in length. Medium packets may be between 256 bytes and 1000 bytes in length and large packets may be defined as those greater than 1000 bytes in length. In certain embodiments, a fourth size or default size may be defined that is equal to a memory page size. The large size may then have an upper limit and packets, such as jumbo packets, that are larger than the large size limit may be scheduled in the default size. The packet size associated with a buffer may be defined by the first packet which is placed in the buffer. For example, if the first packet placed into a buffer is 256 bytes in length, then the buffer may be partitioned into sub-blocks of 256 bytes and packets that are received, which are 256 bytes or less, will be placed in the buffer. The buffer will accumulate packets of the small size as the data transfer progresses. If the buffer becomes full, the I/O device 124 will return the buffer to the device driver and the device driver 128 will process the packets, as appropriate.

Buffers may remain partially full due to the fact that the size of the received packets may vary. Accordingly, a packet may be placed in a partially-filled buffer only if it is of the appropriate size. Continuing with the small-size buffer example, if the data transfer continues and the amount of small packets received does not fill the buffer, the buffer will remain partially full. A particular buffer may remain partially filled while other buffers that are higher in the buffer order are fetched by the I/O device 124. Associating a distance vector with the buffer may cause the buffer to be reclaimed by the device driver 128 if the distance vector is met or exceeded. For example, if a certain packet arrives that causes the I/O device 124 to fetch a buffer that is separated from a partially filled buffer by an amount that exceeds the distance vector associated with the partially filed buffer, a flush command or operation may be executed by the I/O device 128. In executing the flush command, the I/O device 124 will return the partially filled buffer to the device driver 128 prior to the buffer being filled. Once ownership of the buffer is transferred to the device driver 128, the device driver 128 will cache or otherwise store the packets stored in the buffer and release the memory space associated with the buffer. As used herein, "release" of a memory space refers to an action taken by a device driver or other system component that results in control of the memory space being returned to a memory management unit or other operating system component and thereby returned to a general pool of unused memory space that is available for future allocation.

Figure 3A:
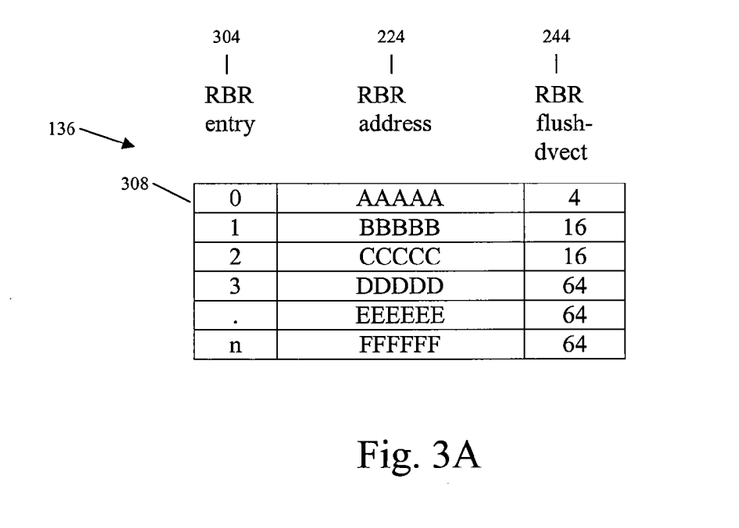
FIGS. 3A-3D are examples of posted buffer records queues.

A distance vector may be defined using attributes shown in FIG. 2. In one instance, a distance vector may be defined within an RBR queue entry using an RBR-entry-attribute 208. Specifically, as shown in FIG. 3A, the RBR-flush-dvect 244 attribute may be used to assign a distance vector for a particular RBR queue 136 entry. An example of the usage of the RBR-flush-dvect 244 attribute is given in FIG. 3A. FIG. 3A is an illustration of an example RBR queue 136. The RBR queue 136 shown in FIG. 3A includes a number of RBR queue entries 304. Each RBR queue entry may include an RBR-address 224 that specifies the location of a buffer in the system memory 112. The buffer located by the address 244 may be used to store packets that are transmitted or received across the network 120. The RBR queue 136 shown in FIG. 3A also includes a RBR-flush-dvect 244 attribute which may define a distance vector for each RBR queue 136 entry. The RBR queue shown in FIG. 3A includes an number of distance vectors of different magnitudes. The zero-ith buffer 308 includes a distance vector of four. Accordingly, the zero-ith buffer 308 will be flushed if a buffer is fetched by the I/O device 124 that is separated from the zero-ith buffer 308 by four or more places in the buffer sequence.

Figure 3B:
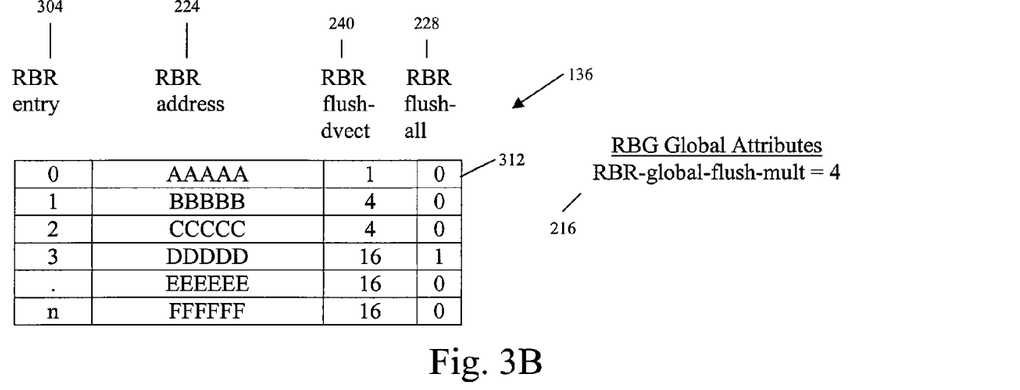

In other instances, a distance vector may be defined using a globally defined multiplier. Referring again to FIG. 2, the RBR-global-flush-mult 216 attribute may be used to specify a global multiplier value. The RBR-global-flush-mult 216 attribute may be used in combination with an RBR-flush-dvect 240, which is defined among the RBR entry attributes 208. Specifically, the RBR-flush-dvect 240 attribute may specify a value that is multiplied by the global-flush-mult 216 value to arrive at a distance vector for a particular RBR queue entry. An example of the usage of the RBR-global-flush-mult 216 attribute is given in FIG. 3B. FIG. 3B is an illustration of an example RBR queue 136. The RBR queue shown in FIG. 3B includes a number of RBR queue entries 304, each having an RBR-address 224 that specifies the location of a buffer in the system memory 112. The buffer located by the address 308 may be used to store packets that are transmitted or received across the network 120. The RBR queue 136 shown in FIG. 3B also includes a RBR-flush-dvect 240 attribute. The RBR-flush-dvect 240 attribute may used in combination with the globally defined RBR-global-flush-mult 216 attribute to define a distance vector for each RBR queue 136 entry. The RBR queue 136 shown in FIG. 3B includes an number of distance vectors of different magnitudes. The zero-ith buffer 312 includes a distance vector of four. Specifically, the distance vector assigned to the zero-ith buffer 312 equals the RBR-flush-dvect 240 (equal to 1) multiplied by the RBR-global-flush-mult 216 (equal to 4) attribute. Accordingly, the zero-ith buffer 312 will be flushed if a buffer is fetched by the I/O device 124 that is separated from the zero-ith buffer 316 by four or more place in the buffer sequence.

Figure 3C:
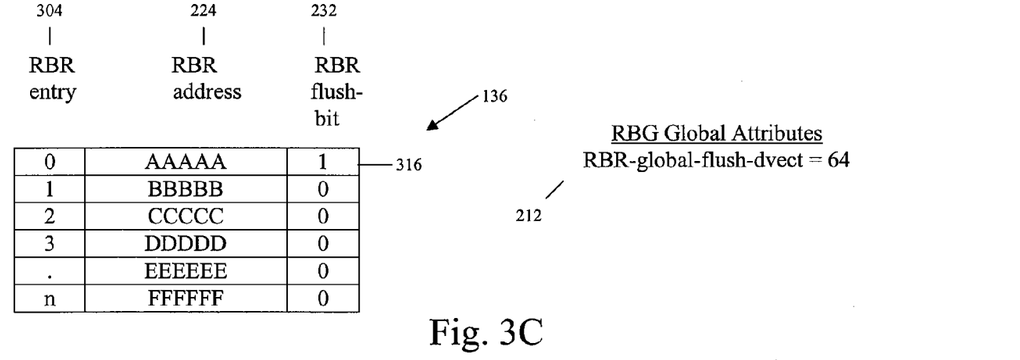
Figure 3D:
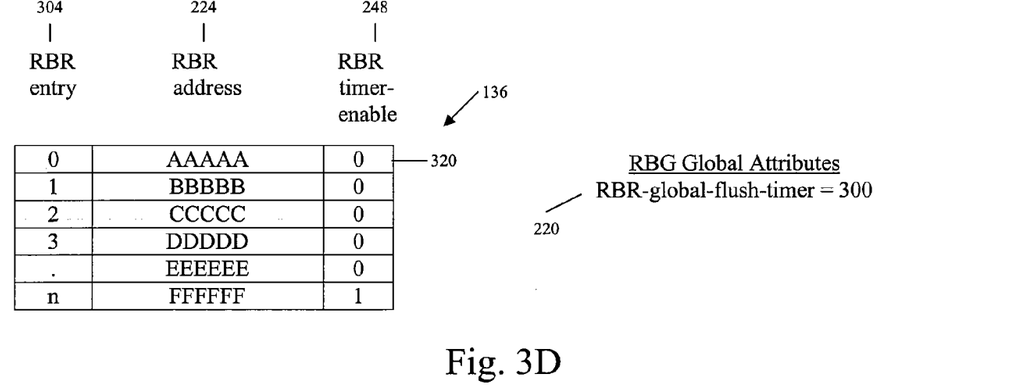

In still another instance, a distance vector may be defined using a globally defined distance vector. Referring again to FIG. 2, the RBR-global-flush-dvect 212 attribute may be used to specify a global distance vector. The RBR-global-flush-dvect 212 attribute may be used in combination with an RBR-flush-bit 232, which is defined among the RBR entry attributes 208. Specifically, the RBR-global-flush-dvect 212 attribute may specify a distance vector that is enabled for a particular RBR queue entry by setting the RBR-flush-bit 232. An example of the usage of the RBR-global-flush-dvect 212 attribute is given in FIG. 3C. FIG. 3C is an illustration of an example RBR queue 136. The RBR queue shown in FIG. 3C includes a number of RBR queue entries 304, each having an RBR-address 224 that specifies the location of a buffer in the system memory 112. The buffer located by the RBR-address 224 may be used to store packets that are sent or received across the network 120. The RBR queue shown in FIG. 3C also includes a RBR-flush-bit 232 attribute. The RBR-flush-bit 232 attribute may used in combination with the globally defined RBR-global-flush-dvect 212 attribute to define a distance vector for each RBR queue entry. The RBR queue shown in FIG. 3C includes distance vectors that are set by a global attribute. The zero-ith buffer 316 includes a distance vector of sixty-four. Specifically, RBR-flush-bit 232 is set in the zero-ith buffer, thereby associating the RBR-global-flush-dvect 212 attribute with the zero-ith RBR queue entry 316. Accordingly, the zero-ith buffer will be flushed if a buffer is fetched by the I/O device 124 that is separated from the zero-ith buffer by sixty-four or more places in the buffer sequence. FIG. 3D is an illustration of an RBR queue associated with a global flush timer. FIG. 3D will be discussed in greater detail below.

Figure 4:
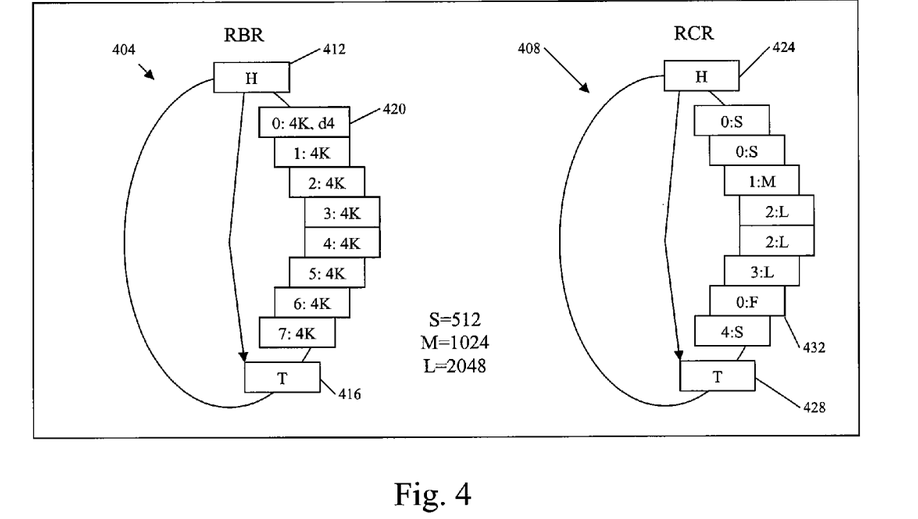
FIG. 4 is an illustration of a set of bounded buffers associated with a data receive operation.

FIG. 4 illustrates this use of a distance vector to flush a partially-filed buffer. FIG. 4 shows a number of buffers that are posted by the device driver 128 through an RBR queue 404. Additionally, FIG. 4 shows a number of completion records that are posted by the I/O device 124 through an RCR queue 408. In FIG. 4, each buffer includes an indication of the buffer number followed by the size of the buffer. By way of illustration and not limitation, the size of each buffer is 4 k. As shown in FIG. 4, the buffers are organized in a ring structure. The ring structure reflects the fact that, in some instances, the length of the RBR queue 404 and/or and the RCR queue 408 may be limited. In particular, a queue may have a finite number of queue entries that are continually reused as a data transfer progresses. Accordingly, the RBR queue 404 and the RCR queue 408 shown in FIG. 4 are depicted as ring structures having a head 412 and a tail 416. Buffers are posted by the device driver 128 proximate to the tail 416. Buffers are fetched and used by the I/O device 124 proximate to the head 412.

Among other advantages, defining a distance vector for one or more of the RBR queue 404 entries may prevent (provided that the hardware/software protocol for the head/tail pointers isn't violated) a queue overrun that may otherwise occur. Specifically, as the data transfer progresses, the head 412 moves in the direction of the tail 416. If buffers are not consumed by the I/O device 124 in a timely manner, new buffers will continue to be added at the tail 416 and the tail 416 may in fact wrap around to correspond to the location of the head 412 causing a queue overrun. If a queue overrun occurs, the data transfer must be halted and the buffers reclaimed by the device driver 128. Halting the data transfer in this way may result in a loss of packets, which arrive from across the network 120 in manner that is not controlled by the I/O device 124. In order to prevent this occurrence, a distance vector may be used to allow the device driver 128 to reclaim buffers in a timely and predictable manner while a data transfer across the network 120 is ongoing.

FIG. 4 illustrates a flushing that occurs on the zero-ith buffer 420. As shown in FIG. 4, the zero-ith buffer 420 is assigned a distance vector of four. The distance vector may be assigned, for example, by the RBR-flush-dvect 244 attribute, as shown in FIG. 3A. As the data transfer occurs and data packets are received by the I/O device 124, the received packets are stored in the buffers specified by the RBR queue. A record of the storage of packets is returned to the device driver 128 through the RCR queue 408. As shown in FIG. 4, each RCR queue 408 entry includes a buffer number in which a received packet is placed followed by a packet size. New records of packet storage are placed in the RCR queue 408 proximate to the tail 428. These records are removed from the RCR queue 408 by the device driver 124 proximate to the head 424 and processed as appropriate. The RCR queue 408 records shown in FIG. 4 represents an arbitrary example of data packet traffic and a partitioning of RBR queue buffers that results from the example network traffic. As the data packets are received, the zero-ith buffer 420 remains partially full until the point in which a buffer is fetched that is at a distance which exceeds the allowed distance vector. Accordingly, at RCR queue entry 432, the zero-ith buffer 420 is flushed as indicated by the "F" symbol.

Figure 5:
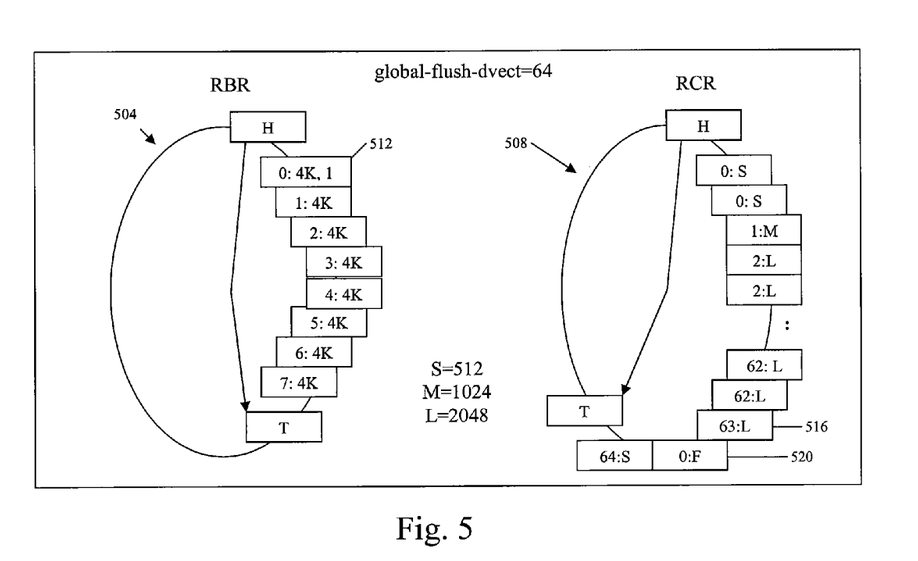
FIG. 5 is an illustration of another set of bounded buffers associated with a receive operation.

In FIG. 4, the distance vector is defined by an RBR entry attribute 208. In contrast, FIG. 5 illustrates a distance vector that is defined by a globally defined RBR queue attribute 204. Like the RBR queue 136 shown in FIG. 3C, the zero-ith buffer 316 includes a RBR-flush-bit that is set. Accordingly, the globally defined distance vector of sixty-four is associated with the zero-ith buffer 512. The example shown in FIG. 5 includes an RCR queue 508 that represents an arbitrary example of data packet traffic. According to the traffic pattern illustrated in FIG. 5, a flush of the zero-ith buffer 512 occurs at entry 520 after the $63^{rd}$ buffer is fetched by the I/O device 124. In flushing the the zero-ith buffer 512, the I/O device 124 relinquishes control of the zero-ith buffer 512 and the device driver 128 caches or otherwise stores the contents of the buffers in system memory.

Figure 6A:
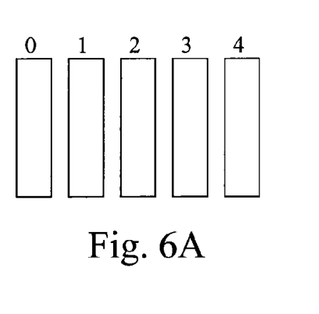
FIGS. 6A-6H are diagrams illustrating an example of a receive operation.

In order to more fully illustrate the operation of a distance vector, reference is made to FIGS. 6A-6H. FIGS. 6A-6H is step-by-step illustration of the example data transfer that is depicted in FIG. 4. Initially, as shown in FIG. 6A, the device driver 128 posts a number of empty buffers to the system memory 112 for consumption by the I/O device 124. The buffers are of a size 4 k and the initial five buffers, namely zero through four, are shown in FIG. 6A.

Figure 6B:
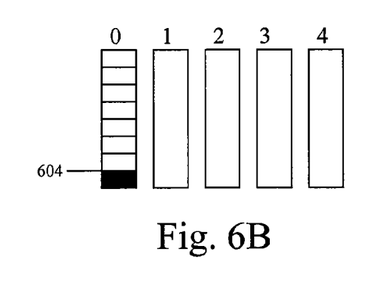

In FIG. 6B, a first packet 604 is received and stored in the zero-ith buffer. The first packet 604 is a small size packet. Accordingly, as can be seen in FIG. 6B, with the first packet 604 in the zero-ith buffer, the zero-ith buffer is partitioned into small size sub-blocks.

Figure 6C:
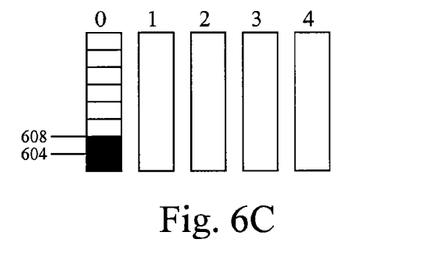

In FIG. 6C, a second packet 608 is received. The second packet 608 is a small size packet. As the zero-ith buffer is partitioned for small size packets and is partially filled, the second packet 608 will be placed in the zero-ith buffer.

Figure 6D:
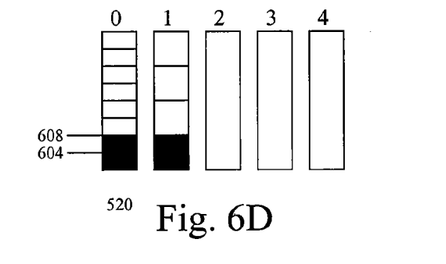

In FIG. 6D, a third packet 612 is received. The third packet 612 is a medium size packet. As the zero-ith buffer is not allocated to receive medium-sized packets, the third packet 612 is stored in the first buffer. Accordingly, with the third packet 612 in the first buffer, the first buffer is partitioned into medium-sized sub-blocks.

Figure 6E:
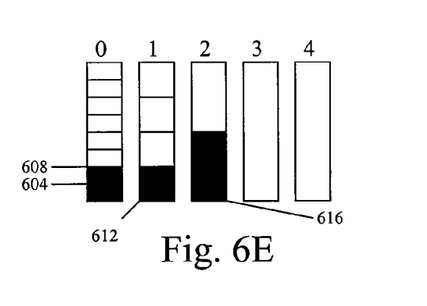

In FIG. 6E, a fourth packet 616 is received. The fourth packet 616 is a large size packet. As neither the zero-ith buffer nor the first buffer is partitioned to store large-sized packets, the fourth packet 616 is stored in the second buffer 628.

Figure 6F:
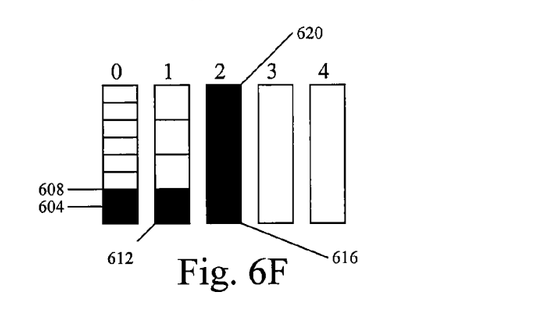

In FIG. 6F, a fifth packet 620 is received. The fifth packet 620 is a large size packet. The second buffer is partitioned for large-sized packets. Accordingly, the fifth packet 620 is stored in the second buffer.

Figure 6G:
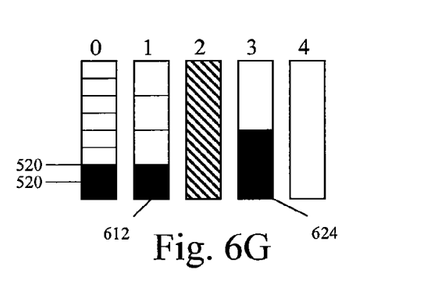

In FIG. 6G, the second buffer is flushed. Specifically, the second buffer is full to its capacity. Therefore the second buffer may be returned to the device driver 128 where the packets may be stored and/or processed, as appropriate.

Figure 6H:
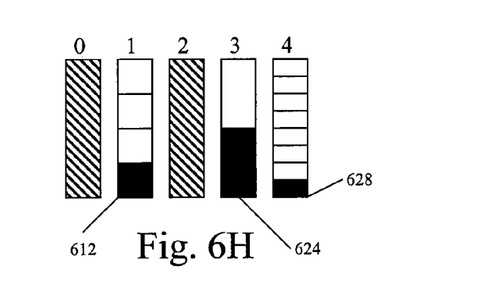

In FIG. 6H, a sixth packet 624 is received. The sixth packet 624 is a large size packet. No partitioned buffers are currently allocated for the large size. Accordingly, the sixth packet 624 is stored in the third buffer. With the storage of the sixth packet 624 in the third buffer, the distance vector for the zero-ith buffer is met. Accordingly, the zero-ith buffer is thereby flushed and the packets 604 and packet 608 stored in the zero-ith buffer are returned to the device driver 128 to be processed, as appropriate. Also in FIG. 6H, a seventh packet 628 is received. The seventh packet 628 is a small size packet. The seventh packet 628 is not stored in the zero-ith buffer because this buffer has been flushed. Accordingly, the seventh packet 628 is stored in the fourth buffer, which then becomes partitioned to store packets of the small size.

Turning now to other flush attributes discussed herein, reference is again made to FIG. 2. In FIG. 2, the RBR-entry attributes 208 include a RBR-flush-all 228 attribute. The RBR-flush-all 228 attribute may be a bit defined in a RBR queue entry. When the RBR-flush-all bit is set, the I/O device 124 may operate to flush all partially filled buffers. For example, the device driver 128 may post an entry to the RBR queue 136 having the RBR-flush-all 228 bit set. When this buffer is fetched by the I/O device 124, the I/O device may flush all partially filled buffers that are higher in the buffer sequence. An example of the usage of the RBR-flush-all bit is given in FIG. 3B. FIG. 3B is an illustration of an example RBR queue 136. In addition to defining a number of distance vectors, the RBR queue shown in FIG. 3B includes entries having an RBR-flush-all-bit 228. The third buffer includes an RBR-flush-all-bit 228 that is set. Accordingly, when the third buffer is fetched by the I/O device 124, the zero-ith, first, and second buffers may be flushed by the I/O device 124, if these buffers are still owned by the I/O device 124.

Referring again to FIG. 2, the RBR-global-attributes 204 include a RBR-global-flush-timer 220. The RBR-global-flush-timer 220 may be measured in clock cycles. The RBR-global-flush-timer 220 may specify a time limit for allowing a particular RBR queue 136 entry to remain under the control of the I/O device 124. The RBR-global-flush-timer may be used in combination with a RBR-flush-timer bit 248 that may be set for a particular RBR queue 136 entry. When the RBR-flush-timer 248 has expired, the I/O device 124 may operate to flush a particular RBR queue buffer. An example of the usage of the RBR-global-flush-timer 220 is given in FIG. 3D. FIG. 3D is an illustration of an example RBR queue 136 associated with a global flush timer. Specifically, the RBR queue 136 shown in FIG. 3D specifies an address for each entry in the RBR queue 136. Additionally, each entry in the RBR queue 136 includes an RBR flush-timer bit 248. The nth entry in the RBR queue 136 includes an RBR flush-timer bit 248 that is set to one. Accordingly, the nth entry in the RBR queue is associated with the global flush timer 220. As shown in FIG. 3D, the RBR global flush timer 220 is set to 300. Accordingly, following the expiration of the global flush timer 220, the I/O device 124 may flush the contents of the nth RBR queue entry, if this buffer is still owned by the I/O device 124 (or perhaps still stored in a hardware cache).

While a flush timer may have application in a data receive context, the following discussion relates to a flush timer in a data transmit context. Flushing a particular RBR queue buffer prior to the buffer contents being transmitted across the network 120 may have use in a number of implementations. In one instance, flushing RBR queue buffers prior to transmission may be used in a real-time environment. For example, the buffer may remain in system memory for a long enough time period to make the data stored in the buffer no longer valid. For example, this may result in the transmission of real-time data such as stock prices or stock ticker data. It may be the case that a more current value of the same attribute is introduced higher in the queue and therefore the old data is no longer valid and may be discarded.

Figure 7:
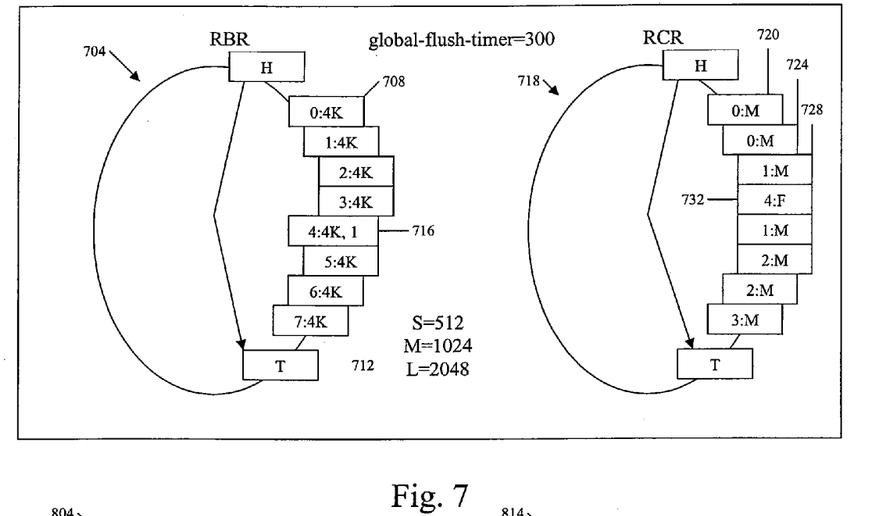
FIG. 7 is an illustration of a set of bounded buffers associated with a transmit operation.

FIG. 7 is an illustration of an ordered set of buffers in accordance with implementations discussed herein. The ordered set of buffers shown in FIG. 7 may be, for example, specified by the RBR queue 704 entries shown in FIG. 3D. The ordered set of buffers begins with a zero-ith entry 708 and ends with a seventh entry 712. As shown in FIG. 7, the fourth entry 716 has a global flush timer-enable bit set to one. The RCR queue shown in FIG. 7 includes RCR queue 718 entries posted by the I/O device 124 as the packets that are stored in the ordered set of buffers are transmitted across the network 120. RCR queue 718 entries 720, 724, 728 show a record of packets that are transmitted across the network 120 during the data transfer. The RCR queue entry 732 shows a record indicating that the global flush timer 736 associated with the fourth buffer 716 has expired. Accordingly, as indicated in the RCR queue entry 732, the fourth buffer 716 of the RBR queue 704 is flushed. A detailed illustration of this example data transfer is given in FIGS. 8A through 8D.

Figure 8A:
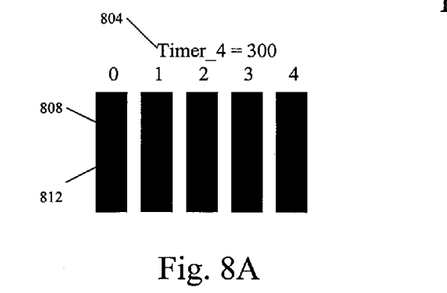
FIGS. 8A-8D are diagrams illustrating an example of a transmit operation.

In FIGS. 7 and 8A through 8D, the buffers include medium-sized packets. In FIG. 8A an initial set of five buffers is posted by the device driver 128 for consumption by the I/O device 124. In consuming the posted buffers, the I/O device 124 fetches a buffer and sends a packet stored in the buffer across the network 120. Also shown in FIG. 8A is a global flush timer 804 that is associated with the fourth buffer and is initially set to 300.

Figure 8B:
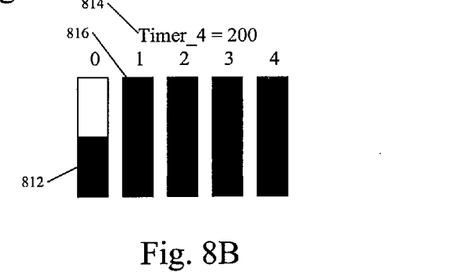
Figure 8C:
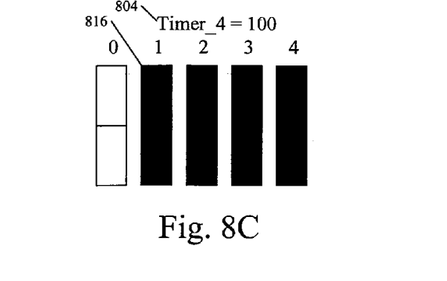

In FIG. 8B, the first packet 808 is transmitted across the network 120. Specifically, the zero-ith 708 buffer is fetched by the I/O device 124 and the first packet 808 stored therein is transmitted across the network 120. The global flush timer 736 associated with the fourth buffer 716 counts down to a value of 200. In FIG. 8C, the second packet 812, which is stored in the zero-ith buffer 708, is transmitted across the network 120 and the global flush timer 736 associated with the fourth buffer 716 counts down to 100.

Figure 8D:
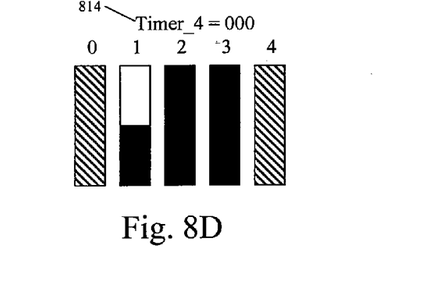

In FIG. 8D, the zero-ith buffer 708 is now empty of packets. Accordingly, the device driver 128 may relinquish control of the zero-ith buffer 708. Additionally, in FIG. 8D, the first buffer is fetched and the third packet 816, which is stored in the first buffer, is transmitted across the network 120. Also, the global flush timer 736 associated with the fourth buffer 716 counts down to a value of zero. Accordingly, the global flush timer 736 expires and the fourth buffer 716 is flushed. In flushing the fourth buffer 716, the I/O device 124 may discard the packets associated with the fourth buffer 716 without transmitting the packets across the network 120. Accordingly, after flushing the fourth buffer 716 the memory space associated with the fourth buffer 716 may be released.

Figure 9:
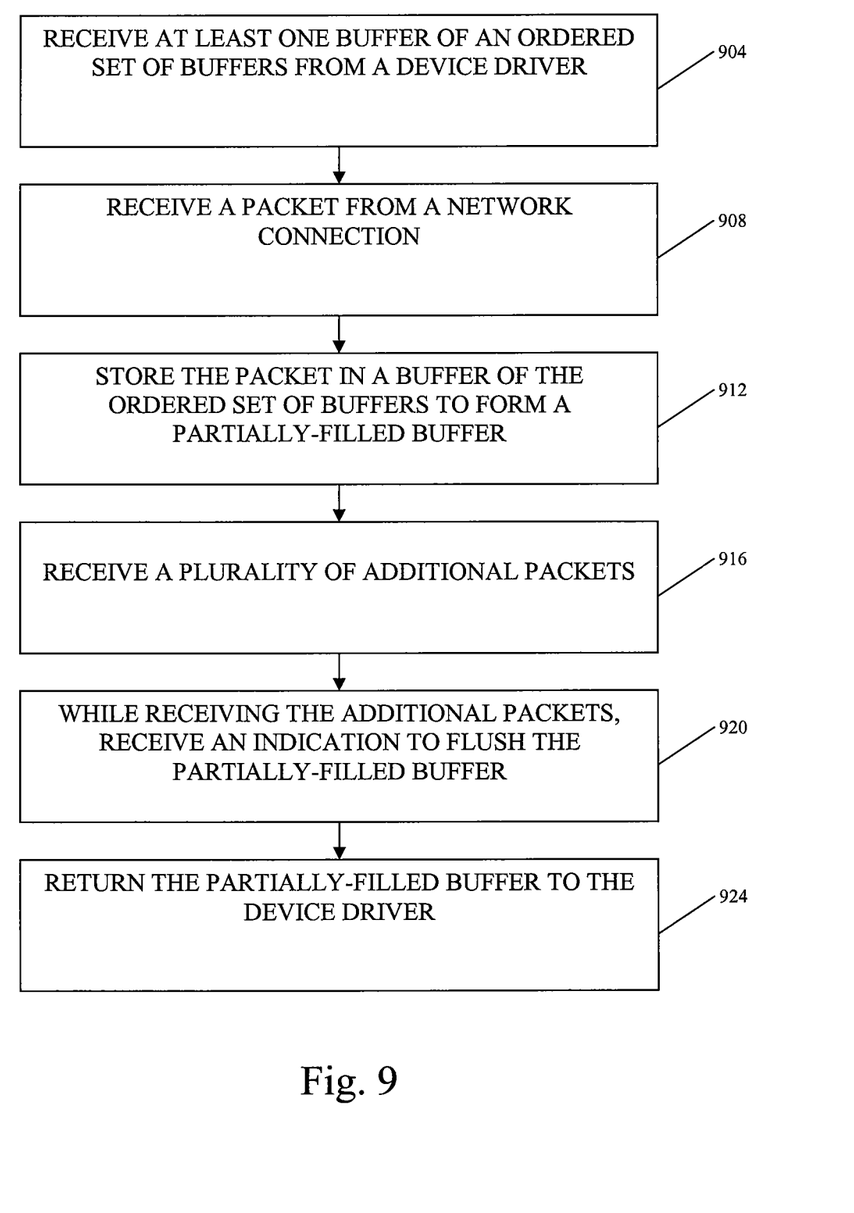
FIG. 9 is a flowchart showing operations in a method of receiving data.
Figure 10:
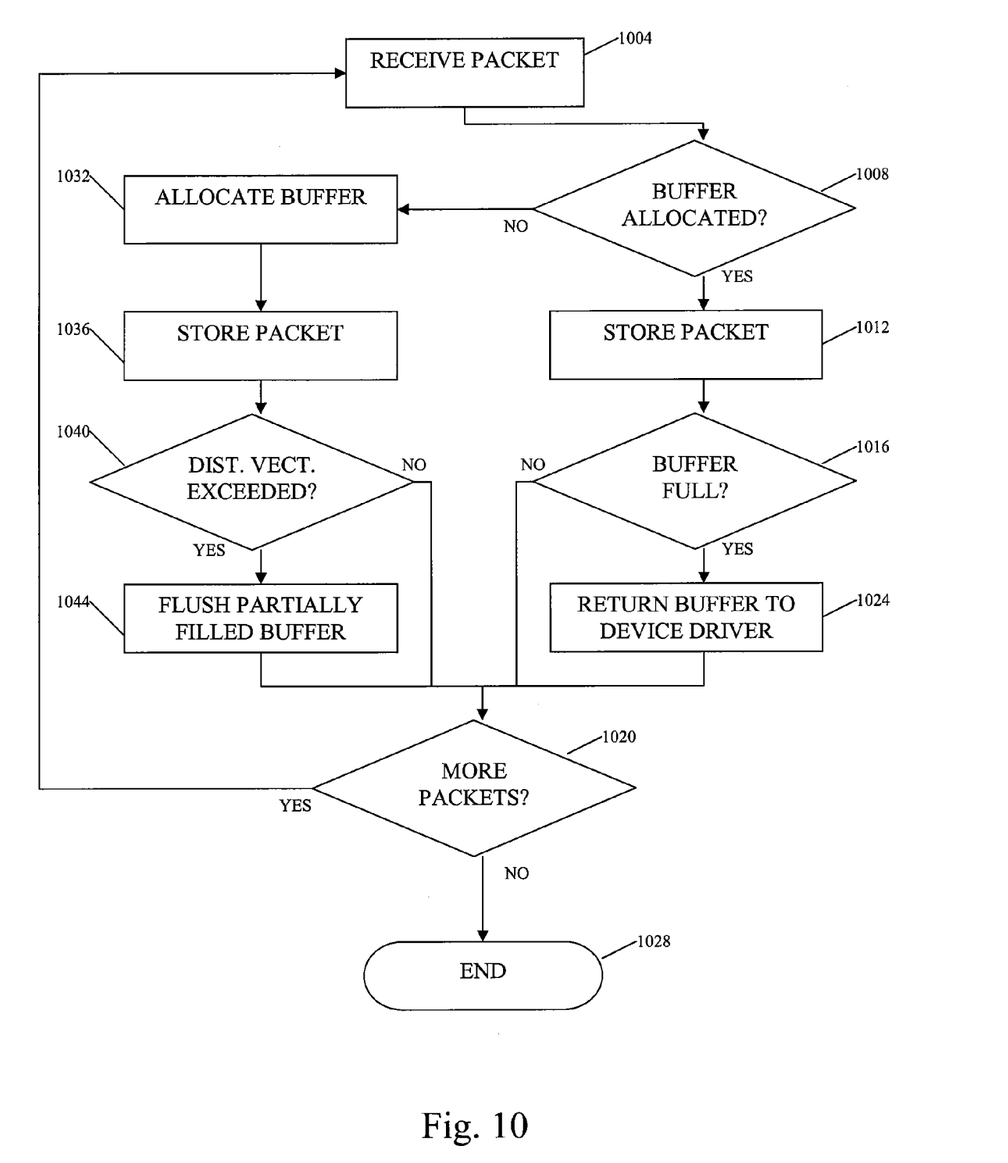
FIG. 10 is a flowchart showing operations in another method of receiving data.

FIGS. 9-12 are flowcharts that illustrate methods in accordance with implementations discussed herein. Various flush mechanisms are discussed throughout the present disclosure. In particular, distance vector mechanisms and timer based mechanisms are discussed and illustrated. Additionally, a mechanism is discussed that causes a flush of all currently held buffers. The various flush mechanisms are discussed in connection with both transmit and receive DMA operations. FIG. 9 and FIG. 10 focus on receive operations, while FIG. 11 and FIG. 12 focus on transmit operations.

FIG. 9 is a flowchart illustrating operations in a method in accordance with implementations discussed herein. FIG. 9 illustrates operations in a method implemented by an I/O device 124 in connection with receiving packets across a network 120. The I/O device 124 may be under the control of a device driver 128, which is part of or associated with an operating system 132. In the course of receiving packets across the network 120, the I/O device 124 is operable to flush one or more partially filled buffers, thereby returning ownership of the partially-filled buffer to the device driver 128.

Initially, at operation 904, the I/O device 124 receives an ordered set of buffers from the device driver 124. The device driver 124 posts the buffers to system memory 112 by, for example, an RBR queue 136. An RBR queue 136 may include, for example, an address associated with each buffer in the ordered set of buffers and one or more attributes which associate a distance vector or other flush attribute with the particular RBR queue entry. Examples of several RBR queues 136 are given in FIGS. 3A through FIG. 3D.

Following operation 904, operation 908 may be executed. In operation 908, the I/O device 124 receives a packet from across the network 120. Following receipt of the packet from across the network 120, the I/O device stores the packet in a buffer at operation 912. Typically, the packet received from across the network 120 is smaller than the full capacity of the buffer which is used to store the packet. Accordingly, in storing the packet in the buffer a partially filled buffer results. Depending on the size of the received packet, the buffer is partitioned or otherwise designated for storing packets of a similar size. A particular buffer may be divided into sub-blocks of either "small" 256 (packet sizes<=256), "medium" 1024 (250>packet sizes<=1024), and "large" 2048 (1024>packet sizes<=2048) in length. Following operation 912, operation 916 may be executed.

In operation 916, the I/O device 124 receives a plurality of additional subsequent packets. The packets that are received from across the network 120 typically arrive in no predictable order and are of varying sizes. As the additional packets are received by the I/O device 124, the I/O device 124 stores the packets in the posted buffers. In order to efficiently use memory space, the I/O device 124 may store packets in buffers with other packets of similar size. Accordingly, the I/O device may store a particular additional packet with the first packet if the particular additional packet is of similar size to the first packet. If not, the I/O device may store the particular additional packet in a different buffer from the buffer which stores the first packet. Accordingly, the buffer which stores the first packet may remain partially filled as other buffers in the ordered sequence of buffers continue to fill. Following operation 916, operation 920 may be executed.

In operation 920, while receiving the additional packets, the I/O device 124 receives an indication to flush the partially filled buffer. The indication to flush the partially filled buffer may result from one of a number of flush mechanisms. In one instance, a distance vector associated with the partially filled buffer may be met or exceeded. In another instance, a flush-all bit may be set. For example, a flush-all bit may be set in a newly received buffer, posted by the device driver 128. In another instance, a flush timer may expire. Following operation 920, operation 924 may be executed.

In operation 924, the partially filled buffer is returned to the device driver 128 by the I/O device 124. Specifically, the I/O device 124 posts a message through the RCR queue 140 to the device driver 128. The message posted by the I/O device 124, indicates that the partially filled buffer has been flushed. In flushing the partially filled buffer, the I/O device 124 will pass ownership of the buffer to the device driver 128. Following this, the device driver 128 will cache or otherwise store the packets associated with the partially filled buffer in system memory, releasing the memory space associated with the partially filled buffer.

FIG. 10 is a flowchart that illustrates a method in accordance with implementations discussed herein. FIG. 10 is a method of receiving packets and simultaneously flushing a partially filled buffer. The method illustrated in FIG. 10 may be considered as one instance of the method illustrated in FIG. 9. Specifically, FIG. 10 illustrates the case where an I/O deice 124 receives an indication to flush the partially filled buffer by the operation of a distance vector. FIG. 10 illustrates the operation of an I/O device 124 as the I/O device 124 receives packets from across a network 120.

Initially, at operation 1004, the I/O device 124 receives a packet. Following operation 1004, operation 1008 may be executed. In operation 1008, a determination is made as to whether a buffer is partitioned in which the received packet may be stored. In order to make efficient use of memory, the I/O device 124 may store the received packets in buffers containing packets of a similar size. Accordingly, at operation 1008 a determination may be made as to whether one of the posted buffers is partitioned to receive packets of a size that corresponds to the size of the received packet. If an appropriate buffer is partitioned, operation 1012 may be executed following operation 1008.

In operation 1012, the I/O device may store the packet received in operation 1004 in a buffer along with other packets of a similar size. Following operation 1012, operation 1016 may be executed. It may be the case that storing the packet in the allocated buffer may result in the buffer being filled to capacity. Accordingly, at operation 1016 a determination is made as to whether or not the buffer is full. If it is determined that the buffer is not full, the method may proceed to operation 1020. If the buffer is in fact full, operation 1024 may follow operation 1016. At operation 1024, the I/O device 124 may return the full buffer to the device driver 128. Specifically, the I/O device 124 may post a record to the RCR queue 140 for consumption and receipt by the device driver 128. Upon receiving the RCR queue 140 entry, the device driver 128 may cache or otherwise store the packets stored in the full buffer, thereby releasing the memory space associated with the buffer. Following operation 1024, operation 1020 may be executed.

At operation 1020, a determination may be made as to whether or not more packets will be received across the network 120. Operation 1020 may follow operation 1016 in the case that the buffer is not full. If, at operation 1024, a determination is made that no more packets are to be received across the network, operation 1028 may follow. If, at operation 1020, a determination is made that more packets are to be received, operation 1004 will follow wherein the next packet is received. At operation 1028 the data transfer may end.

Turning again to operation 1008 in which a determination is made as to whether a buffer is partitioned to receive the packet that is received in operation 1004. Operation 1032 may follow operation 1008 in the case that it is determined that a buffer is not partitioned to receive the packet. At operation 1032, the I/O device 124 may partition one of the posted buffers to receive the packet. In partitioning the buffer, the I/O device may designate the buffer for receiving packets of a particular size. The I/O device 124 may partition the buffer into either small, medium, or large sub-blocks. Following operation 1032, operation 1036 may follow.

In operation 1036, the I/O device 124 may store the packet received in operation 1004 in the buffer that was partitioned in operation 1032. Following operation 1036, operation 1040 may be executed. In operation 1040, a determination may be made as to whether a distance vector has been exceeded. The determination is made at this point due to the fact that a newly allocated buffer has been fetched in order to store a packet. This may result in a distance vector which may be associated with prior buffers being exceeded. An example of a prior buffer distance vector being exceeded is shown in FIGS. 6G and 6H. If a distance vector has not been exceeded, as determined in operation 1040, operation 1020 may follow wherein a determination is made if the I/O device 124 is to receive further packets across the network 120. If, at operation 1004, it is determined that in fact a distance vector has been exceeded, operation 1044 may follow.

At operation 1044, the I/O device flushes a partially filled buffer. Specifically, the I/O device 124 posts a flush message through the RCR queue 140 for receipt or consumption by the device driver 128. In receiving the flush notice through the RCR queue 140, the device driver 128 reclaims the partially filled buffer prior to the buffer being filled to capacity. The device driver 128 caches or otherwise stores the contents of the partially filled buffer in system memory and releases the memory space associated with the partially filled buffer. Following operation 1044, operation 1020 may follow wherein a determination is made if more packets are to be received by the IO device 124.

Figure 11:
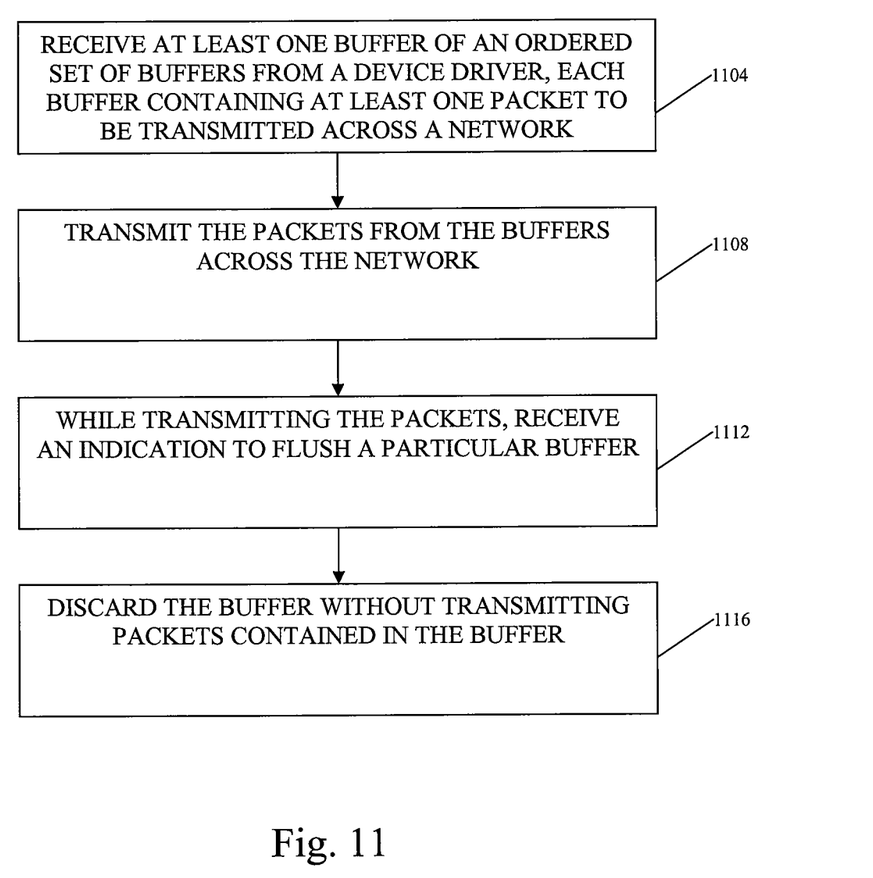
FIG. 11 is a flowchart showing operations in a method of transmitting data.

FIG. 11 is a flowchart illustrating a method in accordance with implementations discussed herein. The method illustrated in FIG. 11 is for transmitting packets across a network by an I/O device 124, wherein the packets to be transmitted across the network are received from a device driver 128. Specifically, the device driver 128 posts the packets to system memory 112 for consumption by the I/O device 124. The method illustrated in FIG. 11 may include flushing or otherwise discarding one or more buffers prior to the packets stored therein being transmitted across the network 120.

Initially, at operation 1104, the I/O device 124 receives at least one buffer of an ordered set of buffers from the device driver 128. Each buffer received by the I/O device 124 contains at least one packet to be transmitted across the network 120. Following operation 1104, operation 1108 may be executed.

In operation 1108, the I/O device 124 proceeds to transmit packets across the network 120. Specifically, the I/O device 124 may fetch a particular buffer and transmit a packet stored in the buffer across the network 120. As the buffers are emptied by the transmission process, the I/O device may return ownership of the buffers to the device driver 128, after which the device driver 128 releases the memory space associated with the emptied buffers. Following operation 1108, operation 1112 may be executed.

In operation 1112, the I/O device 124 receives an indication to flush a particular buffer of the RBR queue 136. The indication may be received by the I/O device 124 concurrently with the I/O device 124 transmitting packets across the network 120. The indication may be given to the I/O device 124 by a number of mechanisms. In one instance, a flush timer associated with a particular buffer may expire. In another instance, a flush-all bit may be set, indicating that all partial buffers are to be flushed. This flush-all bit may be associated with one or more buffers which are recently posted by the device driver 128. Following operation 1112, operation 1116 may be executed.

In operation 1116, one or more buffers may be discarded in response to receiving the indication in operation 1112. In flushing or otherwise discarding a buffer, the I/O device 124 may disregard the contents or packets of the buffer and return the ownership of the buffer to the device driver 128. Following this, the memory space associated with the flushed buffer may be released. It should be noted that in certain instances, a particular packet may span several queue entries. Accordingly, in one embodiment, a particular packet may be cancelled by corrupting other buffer(s) having the remainder of the packet.

Figure 12:
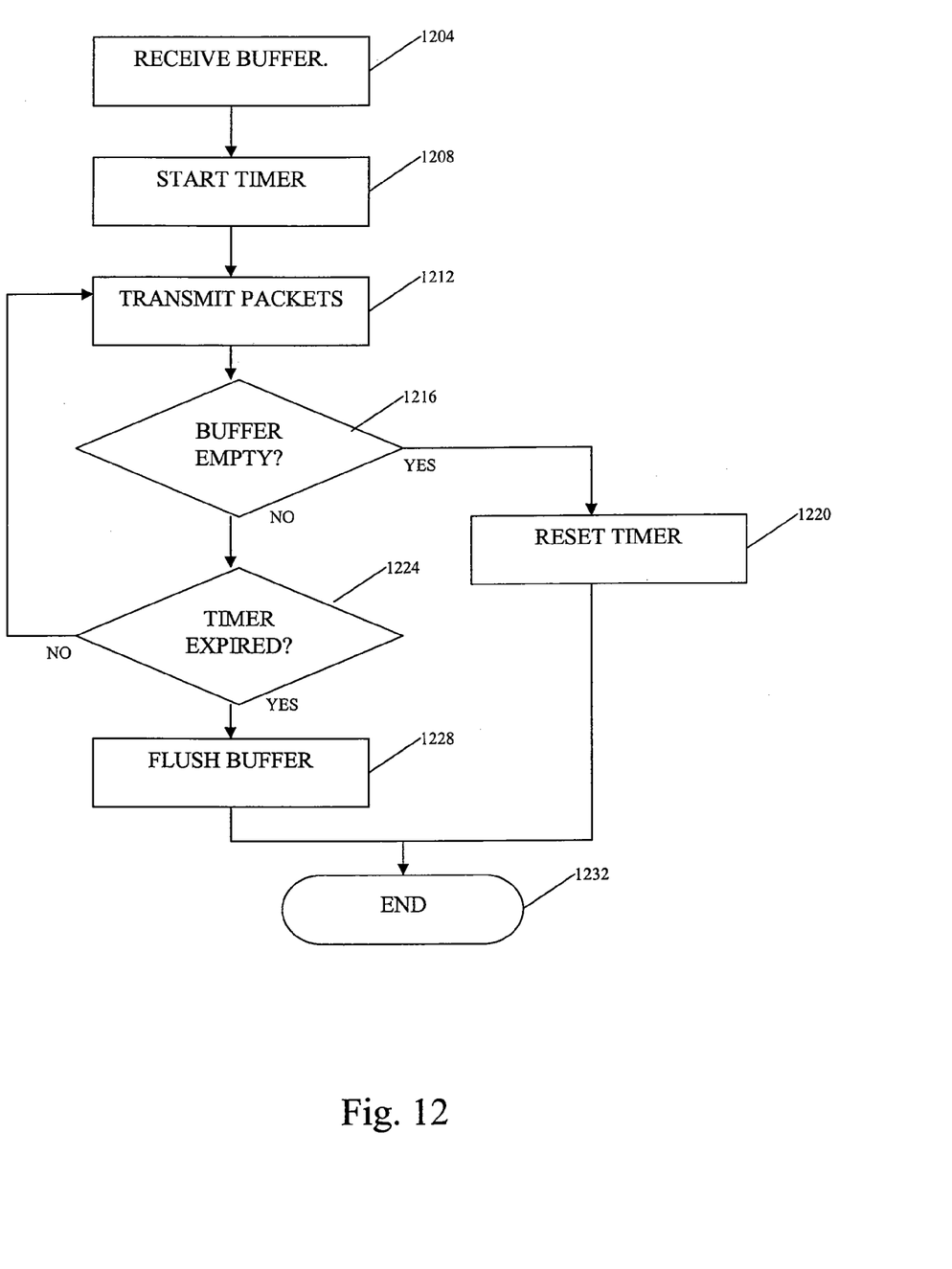
FIG. 12 is a flowchart showing operations in another method of transmitting data.

FIG. 12 is a flowchart illustrating a method in accordance with implementations discussed herein. The method illustrated in FIG. 12 is a method for transmitting packets across a network from an I/O device 124. The method illustrated in FIG. 12 may be considered as a further refinement of the method illustrated in FIG. 11. In particular, the method illustrated in FIG. 12 includes flushing or otherwise discarding a buffer based on a global flush timer.

Initially, at operation 1204, a buffer is received. At operation 1204, the buffer is received by the I/O device 124 by the buffer being posted by the device driver 128 through an RBR queue 136. The buffer received in operation 1204 contains a number of packets to be transmitted by the I/O device 124 across the network 120. The buffer received in operation 1204 may be associated with a timer, the expiration of which indicates that the buffer should be flushed. Following operation 1204, operation 1208 may be executed. In operation 1208 the timer associated with the buffer received in operation 1204 may start. The timer, when expired, indicates that the buffer received in operation 1204 should be flushed. Following operation 1208, operation 1212 may be executed.

In operation 1212, the I/O device 124 continues to transmit packets across the network 120. The packets transmitted in operation 1212 may be associated with buffers which are lower in the ordered set of buffers than the buffer received in operation 1204. Following operation 1212, operation 1216 may be executed. In operation 1216, a determination may be made if a particular buffer has been emptied by the transmission of packets which occurs in operation 1212. If a particular buffer is empty, operation 1220 may follow. At operation 1220, if a timer is associated with the empty buffer, this timer may reset. Specifically, the I/O device 124 may return a flush complete message to the device driver 128 and the timer may thereby reset. If, at operation 1216, it is determined that the buffer is not empty, operation 1224 may be executed.

At operation 1224, a determination is made if the timer associated with the buffer has expired. If the timer has not expired, operation 1212 may follow wherein packets are transmitted by the I/O device 124. If, at operation 1224, it is determined that the timer associated with the buffer has expired, operation 1228 may be executed. In operation 1228, the I/O device flushes the buffer associated with the expired timer. In flushing the buffer in operation 1228, the I/O device 124 may discard the contents of the buffer and return a flush indication message to the device driver through the RCR queue. Following this, the memory associated with the flushed buffer may be released. Following operation 1228, operation 1232 may be executed wherein the method associated with flushing the buffer may end.

The foregoing merely illustrates certain principles of aspects of the invention with reference to implementations that conform to inventive concepts. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. In an input/output device having a packet processing engine operable to directly access a system memory for data transfers across a network, the input/output device controlled by a device driver, a method comprising:
    posting at least one buffer of an ordered set of buffers from the system memory, the ordered set of buffers having been posted to the system memory by the device driver;
    transferring ownership of the ordered set of buffers to the packet processing engine;
    receiving one or more packets from a network connection, the network connection providing access to the network;
    storing the one or more packets in a particular buffer of the ordered set of buffers so that the particular buffer is partially-filled;
    while receiving the one or more packets, transferring ownership of the particular buffer of the ordered set of buffers to the device driver for processing;
    wherein a distance-vector is associated with an originally posted index position of the particular buffer, the distance vector specifying an allowable number of index positions between the originally posted index position of the particular buffer and an index position of a currently-fetched buffer; and
    wherein a flush condition is indicated on the particular buffer if the particular buffer and the currently-fetched buffer are separated in the ordered set of buffers by a number of index positions equal to or greater than the distance vector.

2. The method of claim 1, the method further comprising:
    transferring ownership of the particular buffer in response to the flush condition being indicated during the operation of storing the one or more packets.

3. The method of claim 2, wherein the distance-vector is specified by a globally defined value and a flag set in a record associated with the particular buffer, the method further comprising:
    fetching the particular buffer;
    determining that the flag is set for the particular buffer; and
    assigning the distance-vector associated with the particular buffer a value defined by the globally defined value.

4. The method of claim 1, wherein the distance-vector is specified by a globally defined multiplier value and a value defined in a record associated with the particular buffer, the method further comprising:
    fetching said particular buffer;
    determining a value defined in the record associated with the particular buffer; and
    assigning the distance-vector associated with the particular buffer a value equal to the value defined in the record associated with the particular buffer multiplied by the globally defined multiplier value.

5. The method of claim 1, wherein the distance-vector is specified by a value defined in a record associated with the particular buffer, the method further comprising:
    fetching said particular buffer; and
    assigning the distance-vector associated with said particular buffer a value equal to the value defined in the record associated with the particular buffer.

6. The method of claim 1, wherein the partially-filled buffer is associated with a timer, the method further comprising:
    in response to an expiration of the timer, transferring ownership of the particular buffer to the device driver for further processing.

7. The method of claim 6, wherein the timer is a globally defined value and the timer is associated with the particular buffer by a timer bit associated with the particular buffer, the timer bit being settable by the device driver.

8. The method of claim 1, further comprising:
    in response to receiving an indication from the device driver to flush all partially filled buffers, transferring ownership of the particular buffer to the device driver for further processing.

9. The method of claim 1, wherein receiving the one or more packets includes storing the one or more packets in the ordered set of buffers such that at least one buffer is full, the method further comprising:
    transferring ownership of the at least one full buffer to the device driver for processing.

10. A computer system, comprising:
    a processor in communication with at least one memory operable to store computer executable code;
    a device driver stored in the memory and executing on the processor;
    a buffer records queue stored in the memory, the buffer records queue comprising a plurality of memory addresses for an ordered set of buffers posted to the memory by the device driver, at least one buffer being associated with an attribute that specifies a particular condition, wherein the attribute comprises a distance-vector indicating an allowable number of index positions between an originally posted index position of the at least one buffer and an index position of a currently-fetched buffer;
    an input/output device under the control of the device driver and connected to a network, the input/out device operable to consume the ordered set of buffers posted to the memory by a data transfer between the ordered set of buffers and the network, during the data transfer the input/output device being further operable to relinquish ownership of said at least one buffer in the ordered set of buffers in response to the attribute that specifies the particular condition, wherein the input/output device stores packets received from across the network in the ordered set of buffers and wherein said at least one buffer is a partially-filled buffer; and wherein ownership of the partially-filled buffer is returned to the device driver if separation between the partially-filed buffer and the currently-fetched buffer equals or exceeds the allowable number of index positions.

11. The computer system of claim 10, wherein the attribute further comprises a bit that when set indicates that all partially-filled buffers are to be returned to the device driver.

12. The computer system of claim 10, wherein the attribute further comprises a timer that when expired indicates that the at least one buffer is to be returned to the device driver.

13. The computer system of claim 12, wherein the input/output device discards data stored in the at least one buffer associated with the timer in response to an expiration of the timer.

14. The computer system of claim 10, wherein the input/output device returns a record of a consumption of the ordered set of buffers to the device driver through a second queue stored in memory.

15. The computer system of claim 10, wherein the input/output device stores packets in the ordered set of buffers based on a packet size.

16. In an input/output device having a packet processing engine operable to directly access a system memory for data transfers across a network, the input/output device controlled by a device driver, a method comprising:

fetching at least one buffer of an ordered set of buffers from the device driver, the ordered set of buffers having been posted to the system memory by the device driver wherein a particular buffer of the ordered set of buffers is associated with a distance vector that specifies an allowable number of index positions between an originally posted index position of the particular buffer and an index position of a currently-fetched buffer, wherein a flush condition is indicated on the particular buffer if the particular buffer and the currently-fetched buffer are separated in the ordered set of buffers by a number of index positions equal to or greater than the distance vector;

receiving a packet from a network connection, the network connection providing access to the network;

storing the packet, by the packet processing engine, in the particular buffer of the ordered set of buffers such that the particular buffer is partially-filled;

receiving a plurality of additional packets, through the network connection, and storing the additional packets in the ordered set of buffers;

determining, by the packet processing engine, that the flush condition is indicated; and in response to the flush condition being indicated, relinquishing ownership, by the packet processing engine, of the particular buffer.

17. The method of claim 16, wherein the distance-vector is a globally defined value and a flag is set in a record associated with the particular buffer, the method further comprising the packet processing engine:

fetching the particular buffer;

determining that the flag is set for the particular buffer; and assigning the distance-vector associated with the particular buffer a value defined by the globally defined value.

18. The method of claim 16, wherein the distance-vector is a globally defined multiplier value and a value is defined in a record associated with the particular buffer, the method further comprising the packet processing engine:

fetching the particular buffer;

determining a value defined in the record associated with the particular buffer; and assigning the distance-vector associated with the particular buffer a value equal to the value defined in the record associated with the particular buffer multiplied by the globally defined multiplier value.

* * * * *